Sept. 29, 1931. A. I. MARCUM 1,825,194
ROAD VEHICLE
Filed Oct. 1, 1928
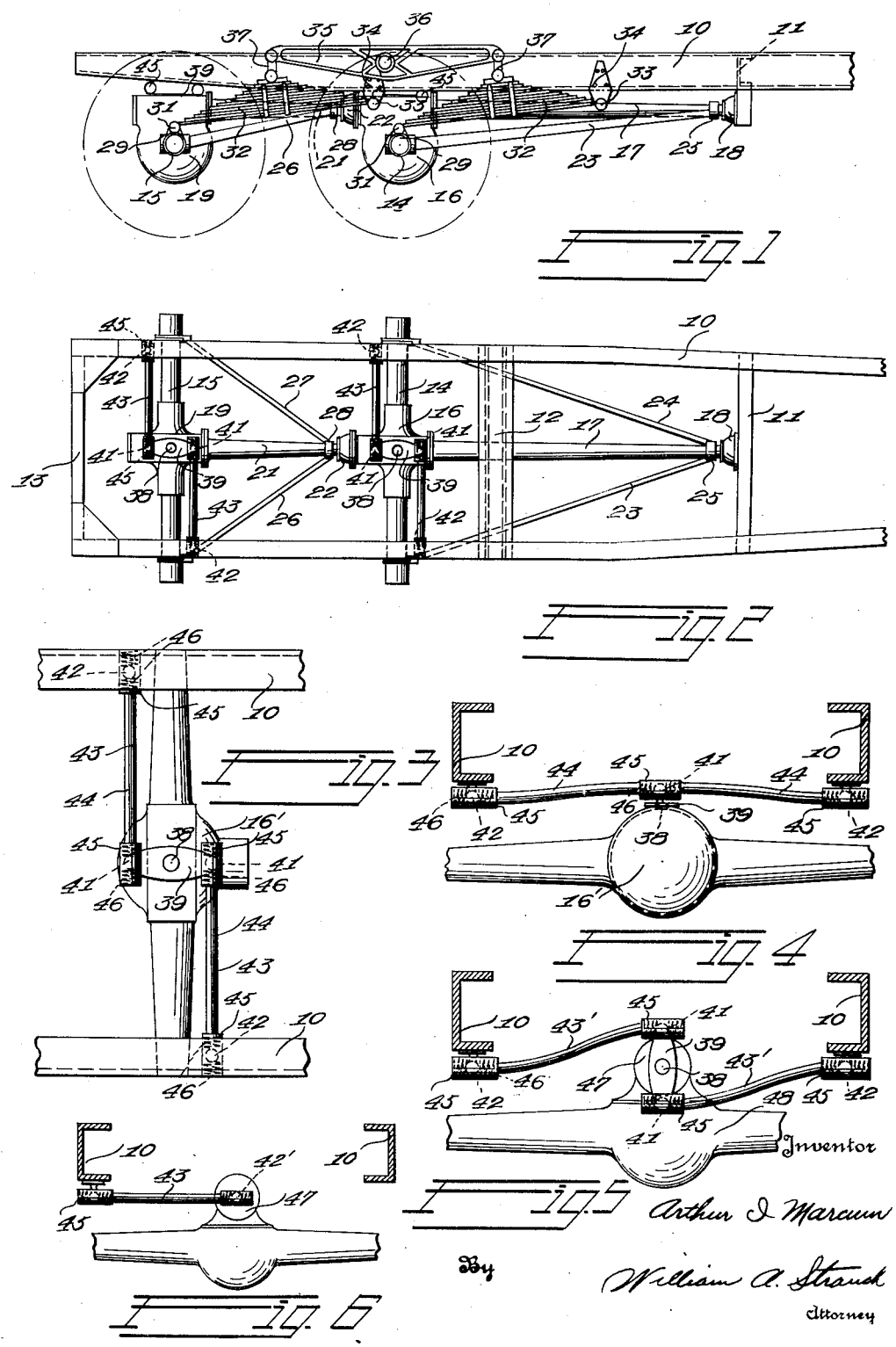

Patented Sept. 29, 1931

1,825,194

UNITED STATES PATENT OFFICE

ARTHUR I. MARCUM, OF OAKLAND, CALIFORNIA

ROAD VEHICLE

Application filed October 1, 1928. Serial No. 309,545.

The present invention relates to road vehicles.

More particularly, the invention relates to road vehicles of the multi-wheel type in which tandem axles are connected to the vehicle frame by means of compensating spring suspensions permitting independent movement of the axles relative to the vehicle frame.

In vehicles of this type in which the axles are connected to cantilever springs which in turn are interconnected by equalizing means for substantial free oscillation of the axles independently of each other, there is a substantial tendency to relative lateral movement between the axles and the vehicle frame resulting in undue strain on the springs and their connections as well as an occasioned side sway to the vehicle body and the load carried thereby.

It is accordingly a primary object of the invention to provide in a vehicle of the above general character, means for substantially avoiding relative lateral movement between the vehicle frame and the axles connected therewith.

It is a further object of the invention to provide means interconnecting the axles and frame of a multi-wheel vehicle for substantially restraining said axles against lateral movement relative to said frame without restraining the free vertical oscillation thereof.

It is a still further object of the invention to connect each of the axles of a multi-wheel road vehicle with the frame thereof by compensating means for maintaining the housings of said axles substantially centrally of said frame.

Further objects of the invention will appear as the description thereof proceeds with reference to the accompanying drawings in which the invention is illustrated in connection with a vehicle construction with which the invention is most effectively adapted, and in which Figure 1 is a side elevation of the rear portion of a multi-drive axle vehicle, the body being omitted and the wheels being indicated diagrammatically, showing the application of my invention.

Figure 2 is a top plan view of the construction illustrated in Figure 1 with the springs and wheels being omitted for more clearly showing the application of my invention.

Figure 3 is a fragmental top plan view disclosing the application of my invention to a modified form of axle housing.

Figure 4 is a view of the construction illustrated in Figure 3 taken transversely of the vehicle frame.

Figure 5 is a view similar to Figure 4 disclosing a modification of my invention and Figure 6 is a similar view of a still further modification of my invention.

Reference will be had to the drawings for a complete understanding of my invention and in which like reference characters designate like parts.

The vehicle disclosed showing the application of my invention is of the multi-drive axle type but the invention hereinafter described is also applicable to other types of vehicles including the four wheel chassis. In the drawings the numeral 10 indicates a portion of the frame of a vehicle which frame includes intermediate transverse members 11 and 12 and a rear transverse member 13. The parts thus described are all rigidly united together in well known manner providing an elongated frame for the vehicle.

Disposed adjacent the rear end of frame 10 are drive axles 14 and 15. Axle 14 is provided with a housing 16 for the usual differential and for a gear such as a worm to drive said differential. Axle 14 is held in proper position endwise of frame 10 by a torque tube 17 which is rigidly bolted at one end thereof to housing 16 and which is connected at the opposite end thereof by means of a universal joint 18 to transverse member 11 of frame 10. The drive shaft for the gear such as a worm included in housing 16 extends through tube 17 and is provided with a universal joint, the center of which is approximately co-incident with the center of universal joint 18.

The axle 15 is provided with a housing 19 containing the usual differential and a gear for actuating the same such as a worm. Axle 15 is held in proper position endwise of frame 10 by a torque tube 21 which is rigidly bolted at one end thereof to housing 19 and which is connected at the opposite end thereof to housing 16 by means of a universal joint 22. The drive shaft for axle 14 extends through housing 16 and continuously through the torque tube 21 for operating the worm in housing 19 which in turn through the differential therein drives axle 15. Said drive shaft is also provided with a universal joint disposed within the universal joint 22 such that the center thereof is approximately coincident with the center of the universal joint 22.

In order to firmly hold the ends of axles 14 and 15 in proper position endwise of frame 10 axle 14 is provided with radius rods 23 and 24 each secured at one end thereof to the axle 14 adjacent the respective end thereof. The other end of each of said radius rods is rigidly united in any suitable manner to torque tube 17 adjacent the universal joint 18 thereof as indicated at 25. The ends of axle 15 are likewise supported from movement endwise of frame 10 by radius rods 26 and 27 each rigidly secured at one end to torque tube 21 adjacent the universal joint 22 as indicated at 28 and at its other end to axle 15 adjacent a respective end thereof.

By the arrangement so far described axle 14 is held from movement endwise of frame 10 by means of torque tube 17 and radius rods 23 and 24. Said axle however, is free to swing vertically and to tilt relative to a vertical longitudinal plane through frame 10 which action is permitted by the universal joint 18. Similarly axle 15 is held from movement toward axle 14 and endwise of frame 10 by means of torque tube 21 and radius rods 26 and 27. The universal joint 22 however, permits axle 15 to swing freely vertically and to tilt with respect to a longitudinal vertical plane through frame 10.

In order to yieldably resist the movements of axles 14 and 15 relative to frame 10 and in order that shocks applied to one axle may be transmitted in part to the other axle the axles are yieldably connected to the frame in the manner disclosed in Figure 1 of the drawings which shows the arrangement on one side of frame 10, the arrangement as will be obvious being the same on the opposite side of frame 10. Each of axles 14 and 15 is provided with a short arm 29 which is united at one end thereof to the corresponding axle by means of a universal joint permitting universal movement of said arm. The other end of each of arms 29 is pivotally connected by means of a pin 31 to an end of a leaf spring assembly 32 provided for each axle. The opposite end of each of the leaf spring assemblies 32 is pivotally connected at 33 to a bracket 34 rigidly secured to frame 10.

In order to equalize the load on axles 14 and 15 and in order that the shocks to the springs of one axle may be transmitted in part to the springs of the adjacent axle the spring assemblies 32 at each side of frame 10 are interconnected by an equalizing lever 35 which is pivotally connected intermediate the ends thereof to frame 10 as indicated at 36 and the opposite ends of which are flexibly connected to the mid-portions of spring assemblies 32 at the respective side of frame 10 by means of shackles 37.

In operation of the construction so far described power is transmitted to drive axles 14 and 15 by means of the through drive shafe in torque tubes 17 and 21. The torque reactions imposed on housings 16 and 19 are resisted by torque tubes 17 and 21, which also serve the purpose of holding axles 14 and 15 in definite spaced relation endwise of frame 10. In view of the universal joints 18 and 22 however, each axle is free to rise and fall or to tilt in vertical planes as the wheels carried thereby pass over irregularities in the road. When irregularities are encountered by the wheels the upward movement of each axle is resisted by springs 32, the arms 29 permitting the pivotally connected ends of springs 32 therewith to move in an arc when the springs deflect so that destructive shocks are not transmitted to the torque resisting connections and the drive shaft housed thereby. It will further be noted that when axle 14 moves vertically carrying with it the ends of springs 32 pivotally connected therewith shackles 37 will be carried upwardly a distance substantially equal to one-half the distance of the movement of axle 14 because the connection of shackles 37 to springs 32 is at a point midway of the pivotal connections of springs 32 with frame 10 and axle 14. Upward movement of shackles 37 causes levers 35 to swing on their pivots 36 thus transmitting the shock in a downward direction to the companion springs 32 in a manner that will be readily understood.

In accordance with the construction so far described a road vehicle of the multi-drive axle type is provided comprising effective torque resisting connections and spring assemblies so connected as to transmit shocks to the springs of one axle to those of the other axle, upon vertical movement of either axle with respect to frame 10 thus providing a construction commensurate with present day demands except that axles 14 and 15 in accordance with the construction so far described are not effectively restrained against lateral movement with respect to frame 10 which in accordance with my present invention is overcome by the constructions now to be described.

Pivotally mounted on each of housings 16 and 19 by means of a suitable pivot pin 38 projecting through the housing at the upper side thereof is the intermediate portion of an equalizing lever 39 to the opposite ends of which is rigidly secured in outwardly spaced relation thereto a ball 41 and secured underneath frame 10 at opposite sides thereof in transverse alinement with each of balls 41 on levers 39 in normal or longitudinal disposition of said levers is a ball 42. Connected with each pair of transversely alined balls 41 and 42 carried by lever 39 and frame 10 respectively is a drag link construction 43 each of which comprises a rod 44 provided with an enlarged cylindrical portion 45 at each end thereof for reception of balls 41 and 42 for movement thereof within the cylindrical portions by means of ball supporting necks longitudinally movable in slots in said cylindrical portions in well known manner and helical springs 46 are positioned within cylindrical portions 45 on opposite sides of balls 41 and 42 for yieldably resisting movement thereof within cylindrical portions 45.

This construction as clearly indicated in Figure 2 provides a pair of transversely extending and longitudinally spaced drag links 43 for each axle 14 and 15, the outer ends of which are flexibly and yieldably connected to frame 10 and the inner ends of which are flexibly and yieldably connected to the opposite ends of an equalizing lever which is centrally pivoted to the corresponding axle housing.

In accordance with this construction, as either of the axles, 14 or 15 moves vertically under the influence of shocks encountered by the wheels carried thereby the drag links 43 connected therewith will permit such movement through their flexible connection at opposite ends thereof with frame 10 and pivotally connected links 39 but lateral or sidewise movement of the axle as when a lateral shock is encountered or when a wheel at one end of either of the axles passes over an obstruction will be prevented by the drag links 43 due to the equalized pivotal connection of the adjacent ends of drag links 43 with the housing of either axle except for a slight amount permitted by springs 46 which cushion the connections.

The axles are however, not restrained from vertical movement, since the change in distance from the central point of either housing 16 or 19 to the opposite sides of frame 10 is compensated for by levers 39 pivotally connected at 38 to housings 16 and 19 and any pivotal movement of either lever 39 is equally communicated to the links 43 connected therewith thus maintaining housings 16 and 19 substantially in the central longitudinal plane of frame 10 during vertical oscillation of axles 14 and 15 against the yielding resistance of springs 32.

In Figures 3 and 4 the construction above disclosed is shown in connection with a different form of axle housing embodying a housing 16' in which is housed a differential and a driving gear therefor or in well known manner.

The two forms of axle housings show the adaptability of the drag link constructions which are applicable to still other forms of housings and may be utilized with dead axle constructions.

In Figure 5 is disclosed a modified arrangement in which lever 39 is disposed vertically and in a plane transverse to frame 10 and pivotally mounted to the rear end of a detachable worm housing 47 of a rear drive axle 48 and to which the adjacent or inner ends of a pair of drag links 43' are connected in the manner above described with the adjacent ends normally in vertically alined disposition.

The operation in this form of the invention is substantially the same as that of the constructions previously described since upon lever 39 tending to swing on its pivot the resulting movement communicated to one of links 43' in one direction will be equally communicated to the other link 43' in the opposite direction thus maintaining housing 47 substantially in the central longitudinal plane of frame 10 upon vertical oscillation of axle 48 resulting from road irregularities encountered by the wheels carried thereby.

In Figure 6 a still further modification is disclosed in which the construction is simplified by the omission of lever 39 and the provision of a single link 43 whose inner end is connected to a ball 42' carried by housing 47 in a manner similar to the connection of the outer ends of links 43 with frame 10.

In this embodiment of the invention which is of comparatively simple construction the axle housings will not be maintained in the central longitudinal plane of frame 10 as in the previous forms but since the vertical movement of an axle relative to the frame is usually of comparatively small magnitude the construction illustrated in Figure 6 constrains housing 47 to movement in an arc about the pivotal connection of link 43 with frame 10 during vertical oscillation of the axle substantially midway of the opposite sides of frame 10.

While I have described specific vehicle constructions provided with the means for preventing lateral movement of the axles relative to the frame, it is to be understood that such means are also well adapted to other types of vehicle constructions since their function is not dependent upon the specific vehicle constructions disclosed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalancy of the claims are therefore intended to be embraced therein.

What I claim as my invention is:

1. A road vehicle comprising a frame; an axle yieldably connected to said frame; a lever centrally pivoted to said axle; rods flexibly and yieldably connected to said frame and the opposite ends of said lever at the respective opposite ends thereof; said flexible and yieldable connections comprising balls rigidly mounted on said frame and said lever, longitudinally movably mounted in cylindrical end portions of said rods against cushioned springs mounted therein.

2. A road vehicle comprising a frame; a pair of axles disposed adjacent one end of said frame; a pair of non-dirigible wheels supporting each axle; a compensating spring suspension interconnecting said axles and said frame for cushioning said axles upon vertical oscillation thereof and permitting limited endwise movement thereof; and means for restricting said endwise movement in order to maintain the planes of wheel rotation substantially parallel to the longitudinal axis of the frame, said means comprising an equalizing lever pivoted intermediate its ends to each of said axles; and a pair of transversely disposed rods flexibly and yieldably connected at the inner ends thereof to the opposite ends of each of said levers; the outer ends of said rods being flexibly connected to said frame.

3. A road vehicle comprising a frame; an axle yieldably connected to said frame; an equalizing lever pivoted intermediate its ends to said housing; a ball rigidly supported by each end of said lever in spaced relation thereto; a ball carried by said frame in transverse alinement with each of said balls supported by said lever; a rod connecting each transversely alined pair of balls; said rod comprising cylindrical slotted end portions in which said balls are movably disposed; and a helical spring in each of said cylindrical portions on each side of said ball disposed therein.

4. In a road vehicle construction, a frame; an axle supported beneath said frame; a member pivoted on said axle centrally thereof; a rod disposed between said axle and said frame in substantially superposed relation to said axle; said rod having its inner end flexibly connected to said centrally pivoted member; and a device, including a ball and resilient means, for universally and yieldably connecting the outer end of said rod to the frame.

5. In a road vehicle construction, a chassis frame; an axle supported beneath said frame; a fixed pivot provided on said frame adjacent an end of said axle; a rod arranged substantially parallel to said axle with its outer end flexibly mounted on said fixed pivot; and a universal connection between the inner end of the rod and a central portion of the axle, said connection including resilient means permitting, and yieldingly resisting, elongation and contraction of the universal connection.

In testimony whereof I affix my signature.

ARTHUR I. MARCUM.